United States Patent
Kitamura et al.

(10) Patent No.: US 10,571,107 B2
(45) Date of Patent: Feb. 25, 2020

(54) FLUORESCENCE LIGHT SOURCE APPARATUS

(71) Applicant: Ushio Denki Kabushiki Kaisha, Tokyo (JP)

(72) Inventors: Seiji Kitamura, Tokyo (JP); Masaki Inoue, Tokyo (JP)

(73) Assignee: USHIO DENKI KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/559,096

(22) PCT Filed: Feb. 10, 2016

(86) PCT No.: PCT/JP2016/053921
§ 371 (c)(1),
(2) Date: Sep. 18, 2017

(87) PCT Pub. No.: WO2016/152297
PCT Pub. Date: Sep. 29, 2016

(65) Prior Publication Data
US 2018/0051871 A1  Feb. 22, 2018

(30) Foreign Application Priority Data
Mar. 20, 2015  (JP) .............. 2015-057054

(51) Int. Cl.
*F21V 29/502* (2015.01)
*B23K 35/26* (2006.01)
(Continued)

(52) U.S. Cl.
CPC ........ *F21V 29/502* (2015.01); *B23K 35/0233* (2013.01); *B23K 35/262* (2013.01);
(Continued)

(58) Field of Classification Search
None
See application file for complete search history.

(56) References Cited

U.S. PATENT DOCUMENTS

2005/0263776 A1* 12/2005 Hsieh .................. H01L 33/0079
257/79
2009/0014746 A1* 1/2009 Ramirez .................. C22C 5/02
257/99
(Continued)

FOREIGN PATENT DOCUMENTS

JP  2011-129354 A  6/2011
JP  2013-084960 A  5/2013
(Continued)

OTHER PUBLICATIONS

International Search Report issued in PCT/JP2016/053921; dated May 17, 2016.
(Continued)

Primary Examiner — Chinessa T. Golden
(74) Attorney, Agent, or Firm — Ken I Yoshida

(57) ABSTRACT

The present invention has as its object the provision of a fluorescence light source apparatus which provides a high emission efficiency of a fluorescent plate and a sufficiently high fluorescence intensity. According to the present invention, the fluorescence light source apparatus includes a fluorescent plate that receives excitation light to emit fluorescence, and a heat dissipation substrate that dissipates heat generated in the fluorescent plate, the fluorescent plate and the heat dissipation substrate being bonded via a solder layer, wherein the solder layer has a void ratio of not more than 75% and a maximum void diameter of not more than 0.4 mm. The solder layer may preferably have a void ratio of not more than 50% and a maximum void diameter of not more than 0.2 mm.

10 Claims, 2 Drawing Sheets

(51) Int. Cl.
  *B23K 35/02* (2006.01)
  *C09K 11/77* (2006.01)
  *H05B 33/14* (2006.01)
  *F21V 9/08* (2018.01)
  *F21V 9/30* (2018.01)
  *F21V 29/89* (2015.01)
  *F21K 9/64* (2016.01)
  *F21S 2/00* (2016.01)
  *C22C 13/00* (2006.01)
  *C22C 9/00* (2006.01)
  *C22C 5/02* (2006.01)
  *C22C 9/01* (2006.01)
  *C22C 9/06* (2006.01)

(52) U.S. Cl.
  CPC ............ *C09K 11/7774* (2013.01); *F21K 9/64* (2016.08); *F21S 2/005* (2013.01); *F21V 9/08* (2013.01); *F21V 9/30* (2018.02); *F21V 29/89* (2015.01); *H05B 33/14* (2013.01); *B23K 35/26* (2013.01); *C22C 5/02* (2013.01); *C22C 9/00* (2013.01); *C22C 9/01* (2013.01); *C22C 9/06* (2013.01); *C22C 13/00* (2013.01)

(56) References Cited

U.S. PATENT DOCUMENTS

2013/0056775 A1* 3/2013 Kawakami ................ F21V 9/16
                                                    257/98
2013/0313309 A1* 11/2013 Kitajima ................ H01L 21/64
                                                    228/180.5

FOREIGN PATENT DOCUMENTS

JP    2014-060164 A    4/2014
JP    2015-050124 A    3/2015
WO    2014/065051 A1   5/2014

OTHER PUBLICATIONS

An Office Action; "Decision to Grant a Patent," issued by the Japanese Patent Office dated Sep. 6, 2016, which corresponds to Japanese Patent Application No. 2015-057054.
Katsis et al.; Void-Induced Thermal Impedance in Power Semiconductor Modules: Some Transient Temperature Effects; IEEE Transactons on Industry Applications; 2003; vol. 39, No. 5; pp. 1239-1246.

* cited by examiner

FLUORESCENCE LIGHT SOURCE APPARATUS

TECHNICAL FIELD

The present invention relates to a fluorescence light source apparatus which uses fluorescence generated by exciting a phosphor by laser light.

BACKGROUND ART

Fluorescence light source apparatuses which excite a phosphor by laser light and emit fluorescence emitted from the phosphor are currently known. For example, Patent Literature 1 describes a fluorescence light source apparatus configured so that a fluorescent plate constituting a phosphor and a heat dissipation substrate are bonded by a bonding material. Examples of the bonding material may include an organic adhesive, an inorganic adhesive, a low-melting-point glass and a metal brazing material. Of these, a metal brazing material is described to be desirably used because of high reflectance and a high heat transfer characteristic.

CITATION LIST

Patent Literature

Patent Literature 1: Japanese Patent Application Laid-Open No. 2011-129354

SUMMARY OF INVENTION

Technical Problem

For example, if the fluorescent plate is brazed to the heat dissipation substrate by using a metal brazing material, high temperature treatment is needed. There has thus been a problem that the emission efficiency of the fluorescent plate can drop. There has been another problem that a difference in thermal expansion between the heat dissipation substrate and the fluorescent plate during bonding causes exfoliation of the bonding portion between the fluorescent plate and the heat dissipation substrate.

On the other hand, in the case of soldering in which a metal solder capable of bonding at relatively low temperature is used as a solder material, a void may be generated in the solder layer due to reasons such as vaporization of flux used during bonding and wettability of the solder material. For example, if a ribbon-shaped (band-shaped, sheet-shaped) solder material is used, a void can be generated because air caught in a gap and the like of the solder material is unable to be fully expelled. For example, if the formed solder layer has a large maximum void diameter, as illustrated in FIG. 3, heat GH generated in an area of a fluorescent plate 40 directly above a void 55 is thermally insulated by the void 55 in a pseudo manner to increase thermal resistance in the vertical direction. The heat dissipation paths of the heat GH generated in the fluorescent plate 40 are then formed, for example, to reach the heat dissipation substrate 45 via sides of the void 55. The heat GH generated in the fluorescent plate 40 fails to be efficiently transferred to the heat dissipation substrate 45 side. There has thus been a problem that the area of the fluorescent plate 40 directly above the void 55 increases locally in temperature to cause temperature quenching with a drop in emission efficiency. There has been another problem that the presence of the void 55 in the solder layer 50 reduces fluorescence reflectance of the solder layer 50 made of a metal solder, with a drop in the intensity of the fluorescence emitted from the fluorescent plate 40. There is yet another problem that the temperature increase of the fluorescent plate 40 melts the solder material constituting the solder layer 50 to lower the adhesion between the fluorescent plate 40 and the heat dissipation substrate 45.

Such problems have been found to be significant if the solder layer 50 has a void ratio of higher than 75% and a maximum void diameter L of greater than 0.4 mm.

The present invention has been made in view of the foregoing circumstances and has as its object the provision of a fluorescence light source apparatus which provides a high emission efficiency of the fluorescent plate and a sufficiently high fluorescence intensity.

Solution to Problem

A fluorescence light source apparatus according to the present invention includes a fluorescent plate that receives excitation light to emit fluorescence, and a heat dissipation substrate that dissipates heat generated in the fluorescent plate, the fluorescent plate and the heat dissipation substrate being bonded via a solder layer, wherein the solder layer has a void ratio of not more than 75% and a maximum void diameter of not more than 0.4 mm.

In the fluorescence light source apparatus according to the present invention, the solder layer may preferably have a void ratio of not more than 50% and a maximum void diameter of not more than 0.2 mm.

Advantageous Effects of Invention

According to the fluorescence light source apparatus of the present invention, a favorable bonding state is obtained between the fluorescent plate and the heat dissipation substrate since the solder layer has a void ratio and a maximum void diameter of not more than certain magnitudes. This can prevent the fluorescent plate and the heat dissipation substrate from exfoliation, and can suppress the degree of hindrance to the dissipation of the heat generated in the fluorescent plate by the void. Since the heat generated in the fluorescent plate can be efficiently dissipated, a local temperature increase of the fluorescent plate can be suppressed to provide a high emission efficiency of the fluorescent plate and a high fluorescence intensity.

DESCRIPTION OF EMBODIMENTS

An embodiment of the present invention will be described in detail below.

Figure 1:
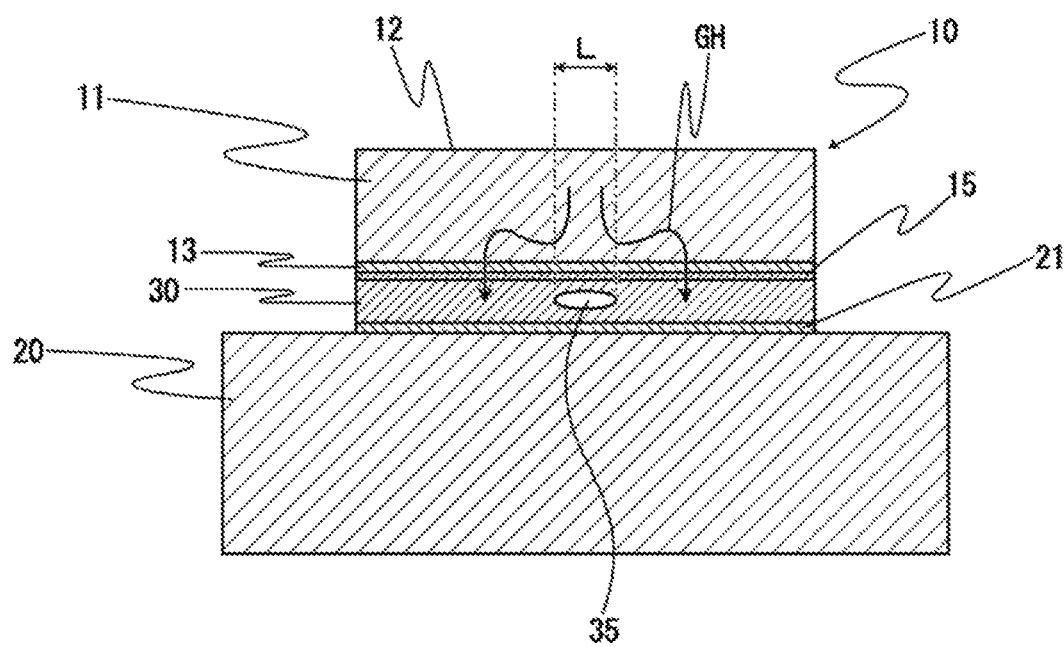
FIG. 1 is an explanatory diagram schematically illustrating a configuration example of a fluorescence emission member in a fluorescence light source apparatus according to the present invention.

FIG. 1 is an explanatory diagram schematically illustrating a configuration example of a fluorescence emission member of a fluorescence light source apparatus according to the present invention.

The fluorescence light source apparatus includes a fluorescence emission member 10 including a fluorescent plate 11 of rectangular flat plate shape which receives excitation light to emit fluorescence, and a heat dissipation substrate 20 of rectangular flat plate shape which dissipates heat generated in the fluorescent plate 11. In the fluorescence emission member 10, a back surface of the fluorescent plate 11 of which a front surface serves as an excitation light receiving surface 12 is bonded to a front surface of the heat dissipation substrate 20 via a solder layer 30. In the fluorescence emission member 10, fluorescence is emitted from the front surface of the fluorescent plate 11.

For example, a laser light source including a semiconductor laser element (LD element) for emitting laser light of a blue region, with an oscillation wavelength of 455 nm, may be used as an excitation light source.

For example, an irradiation condition of the fluorescent plate 11 with the excitation light is such that an excitation light density is 15 to 200 W/mm$^2$.

For example, a fluorescent plate 11 having a thermal conductivity of 6 to 35 W/(m·K) may preferably be used as the fluorescent plate 11. Specifically, for example, a fluorescent plate made of a YAG phosphor doped (activated) with a rare earth element may be used. Examples of the rare earth element may include cerium (Ce), praseodymium (Pr) and samarium (Sm). A fluorescent plate made of a phosphor containing a metal compound may be used.

The fluorescent plate 11 has a thickness of 0.05 to 1 mm, for example.

From the viewpoint of light extraction efficiency, a light reflection film 13 made of high reflectance metal may preferably be formed on the back surface of the fluorescent plate 11.

Specific examples of the light reflection film 13 may include metal films such as an aluminum (Al) film and a silver (Ag) film, and enhanced reflection films obtained by forming a dielectric multilayer film on the metal films.

From the viewpoint of bondability to the solder layer 30, a metal film 15 made of a nickel/platinum/gold (Ni/Pt/Au) film or a nickel/gold (Ni/Au) film may preferably be formed, for example, by evaporation on the back surface of the fluorescent plate 11, or more specifically, the back surface of the light reflection film 13.

For example, the metal film has a thickness of Ni/Pt/Au=30 nm/500 nm/500 nm.

The heat dissipation substrate 20 may preferably be made of a material having a thermal conductivity of not less than 90 W/(m·K), for example, and specifically 230 to 400 W/(m·K), for example. Examples of such a material may include copper, copper compounds (such as MoCu and CuW) and aluminum.

The heat dissipation substrate 20 has a thickness of 0.5 to 5 mm, for example.

From the viewpoint of a heat dissipation property and the like, the front surface of the heat dissipation substrate 20 may preferably have an area greater than that of the back surface of the fluorescent plate 11.

From the viewpoint of bondability to the solder layer 30, a metal film 21 made of a nickel/gold (Ni/Au) film may preferably be formed, for example, by plating on the front surface of the heat dissipation substrate 20. For example, the metal film 21 has a thickness of Ni/Au=5000 to 1000 nm/1000 to 30 nm.

A solder material having a thermal conductivity of not less than 40 W/(m·K), for example, 40 to 70 W/(m·K) may preferably be used as the solder material constituting the solder layer 30. For example, solder creams of cream form (paste form) obtained by mixing materials such as Sn and Pb with flux and other impurities, as well as Sn—Ag—Cu solder and Au—Sn solder, may be used as the solder material.

For example, the solder layer 30 has a thickness of 20 to 200 μm.

In the foregoing fluorescence light source apparatus, the solder layer 30 has a void ratio of not more than 75% and a maximum void diameter L of not more than 0.4 mm.

As employed herein, the "void ratio" refers to the ratio of the area of the projected image of a void 35 in a plan view (if there are a large number of voids 35, a total area thereof) to the total area of the solder layer 30 (area proportion of the void 35 in the solder layer 30). The "maximum void diameter" refers to a maximum distance between two parallel lines sandwiching the projected image of the void 35 in a plan view.

The void ratio and the maximum void diameter L of the solder layer 30 can be measured, for example, by an X-ray inspection apparatus.

The solder layer 30 may preferably have a void ratio of not more than 50% and a maximum void diameter L of not more than 0.2 mm.

Such a solder layer 30 can reduce propagation distances sideways from the void 35 in terms of heat dissipation paths of heat GH generated in an area of the fluorescent plate 11 directly above the void 35. A temperature increase of the fluorescent plate 11 can thus be reliably suppressed.

If the void ratio of the solder layer 30 is higher than 75%, the heat GH generated in the fluorescent plate 11 fails to be efficiently dissipated, and a temperature increase of the area of the fluorescent plate 11 directly above the void 35 is unable to be suppressed.

Similarly, if the maximum void diameter L of the solder layer 30 is greater than 0.4 mm, the heat GH generated in the fluorescent plate 11 fails to be efficiently dissipated, and a temperature increase of the area of the fluorescent plate 11 directly above the void 35 is unable to be suppressed.

The heat dissipation substrate 20 and the fluorescent plate 11 can be bonded in the following manner.

For example, if a solder cream (containing flux) is used as the solder material, the fluorescent plate 11 is arranged on the front surface of the heat dissipation substrate 20 via the solder material. The solder material is heated to melt at a temperature higher than its melting point, for example, under reduced pressure in an air atmosphere or a nitrogen gas atmosphere. The solder material is then cooled to solidify, whereby the fluorescent plate 11 is bonded to the front surface of the heat dissipation substrate 20 via the solder layer 30.

For example, if a solder material without flux is used, the solder material is heated to melt at a temperature higher than its melting point under reduced pressure in an inactive gas atmosphere such as a nitrogen gas atmosphere, or in a mixed gas atmosphere of nitrogen gas and hydrogen gas. The solder material is then cooled to solidify, whereby the fluorescent plate 11 is bonded to the front surface of the heat dissipation substrate 20 via the solder layer 30.

The foregoing bonding treatment is performed in a state in which the fluorescent plate 11, the solder material, and the heat dissipation substrate 20 are pressed in a thickness direction. For example, the pressure applied to the fluorescent plate 11 during the bonding treatment may preferably be 0 to 2.4 gf/cm². This can form the solder layer 30 with a void ratio of not more than 75% and a maximum void diameter L of not more than 0.4 mm. The magnitudes of the void ratio and the maximum void diameter L of the formed solder layer 30 can be controlled, for example, by adjusting the pressure condition.

According to the fluorescence light source apparatus described above, the solder layer 30 constituting the fluorescence emission member 10 has a void ratio and a maximum void diameter L of not more than certain magnitudes, whereby a favorable bonding state is obtained between the fluorescent plate 11 and the heat dissipation substrate 20. The degree of hindrance to the dissipation of the heat generated in the fluorescent plate 11 by the void 35 can thus be suppressed. Since the heat generated in the fluorescent plate 11 can be efficiently dissipated, a local temperature increase of the fluorescent plate 11 can be suppressed. The occurrence of temperature quenching due to a temperature increase of the fluorescent plate 11 can thus be avoided to obtain a high emission efficiency of the fluorescent plate 11 and a sufficiently high emission intensity. In addition, the solder material constituting the solder layer 30 can be prevented from melting to cause exfoliation of the fluorescent plate 11 and the heat dissipation substrate 20. The heat generated in the fluorescent plate 11 can thus be reliably transferred to the heat dissipation substrate 20, so that a local temperature increase of the fluorescent plate 11 can be reliably suppressed.

EMBODIMENT

An embodiment carried out to confirm the effects of the present invention will be described below. However, the present invention is not limited thereto.

Embodiment 1

A metal film (21) made of a nickel/gold (Ni/Au=2500 nm/30 nm) film was formed on the front surface of a heat dissipation substrate (20) made of a 30Mo70Cu alloy substrate, having dimensions of 17 mm (length)×17 mm (width)×0.47 mm (thickness).

In a treatment chamber, a fluorescent plate (11) having a light reflection film (13) on the back surface was arranged on the front surface of the heat dissipation substrate (20) having the metal film (21) formed thereon, via a ribbon-shaped solder material made of Sn (96.5%) Ag (3%) Cu (0.5%) solder (melting point=218° C., thermal conductivity=64.2 W/(m·k)). The fluorescent plate (11), the solder material and the heat dissipation substrate (20) were pressed between spring pins while appropriately adjusting the pressure applied to the fluorescent plate (11) within the range of 0 to 2.4 gf/cm². In such a state, the solder material was heated at 218° C., a temperature of not less than its melting point, to melt. The solder material was then cooled to solidify, whereby the fluorescent plate (11) was bonded to the front surface of the heat dissipation substrate (20) via the solder layer (30). In such a manner, a plurality of fluorescence emission members (10) having the configuration illustrated in FIG. 1 were fabricated.

The solder layers (30) of the fluorescence emission members (10) had a thickness in the range of 20 to 30 μm. The void ratios and the maximum void diameters (L) of the solder layers (30) were measured by an X-ray inspection apparatus. The void ratios were in the range of 0 to 75%, and the maximum void diameters (L) were in the range of 0 to 0.62 mm.

Figure 2:
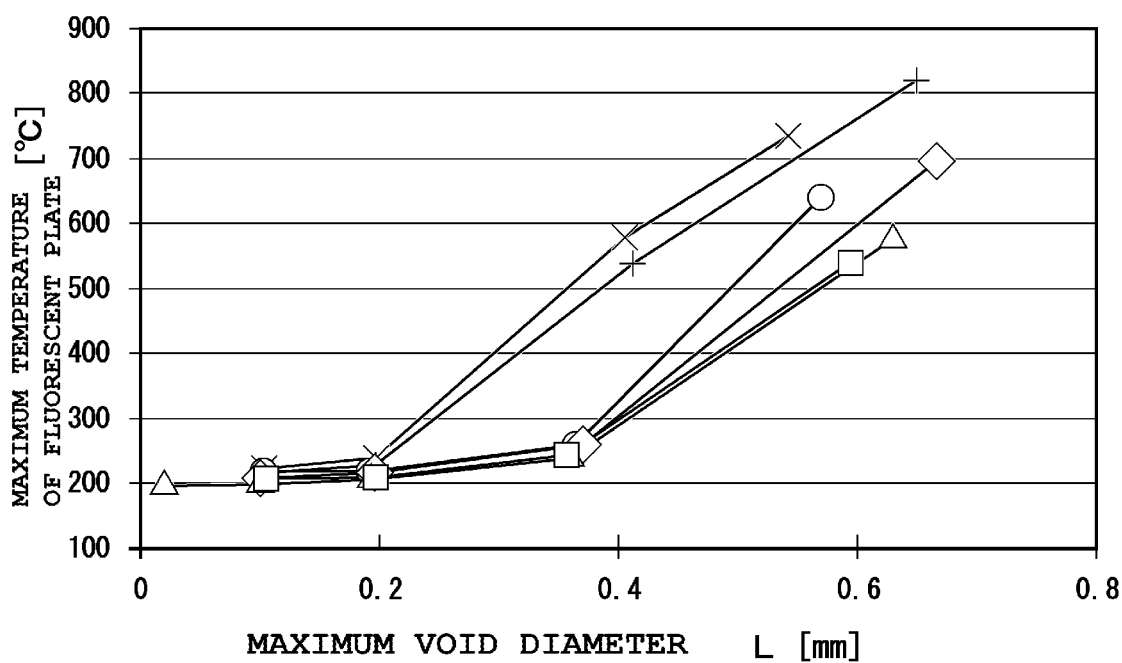
FIG. 2 is a graph illustrating a relationship between a maximum void diameter and a maximum temperature of a fluorescent plate.
Figure 3:
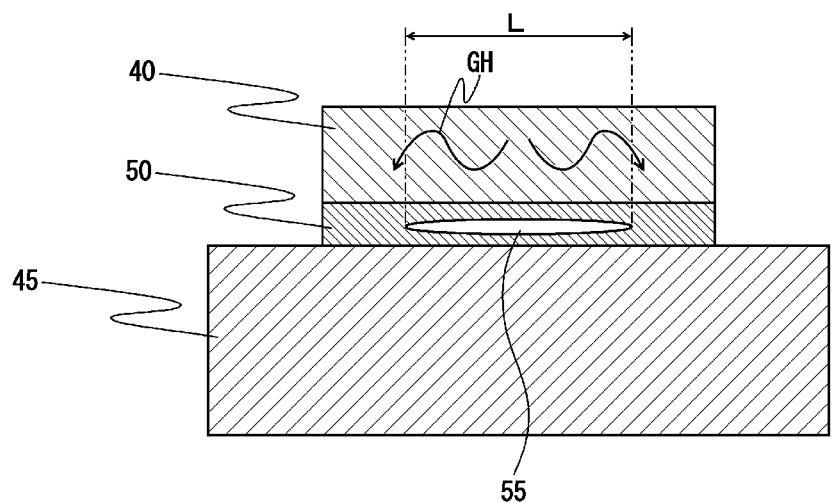
FIG. 3 is an explanatory diagram schematically illustrating a configuration example of a fluorescence emission member in a conventional fluorescence light source apparatus.

For each of the plurality of fluorescence emission members (10) obtained as described above, the excitation light receiving surface (12) of the fluorescent plate (11) was irradiated with laser light having an oscillation wavelength of 445 nm from the laser light source and a maximum temperature of the fluorescent plate (11) was measured. FIG. 2 illustrates the results. In FIG. 2, a curve plotted with x marks, a curve plotted with cross marks, a curve plotted with circle marks, a curve plotted with rhombic marks, a curve plotted with triangular marks and a curve plotted with square marks represent the results of the fluorescence emission members (10) with a solder layer (30) having a void ratio of 75%, 65%, 50%, 35%, 20% and 10%, respectively.

As is clear from the results illustrated in FIG. 2, the fluorescent plates (11) of the fluorescence emission members (10) having a maximum void diameter (L) of not more than 0.2 mm showed a maximum temperature of approximately 200° C. It was confirmed that at maximum void diameters (L) greater than 0.4 mm, the maximum temperature of the fluorescent plate (11) reached 500° C. or above regardless of the void ratio. A possible reason is that the void (35) in the solder layer (30) hinders dissipation of heat generated in the fluorescent plate (11). If, for example, the maximum temperature of the fluorescent plate (11) is 500° C. or higher, the maximum temperature of the solder layer (30) becomes approximately 400° C. or higher which is above the melting point of the solder material. It was confirmed that such temperature melted the solder material, causing a problem that the heat dissipation substrate (20) and the fluorescent plate (11) lost adherence and separated from each other.

REFERENCE SIGNS LIST 10 fluorescence emission member
11 fluorescent plate
12 excitation light receiving surface
13 light reflection film
20 heat dissipation substrate
21 metal film
30 solder layer
35 void
40 fluorescent plate
45 heat dissipation substrate
50 solder layer
55 void

The invention claimed is:

1. A fluorescence light source apparatus comprising:
a fluorescent plate having a fluorescent-plate front surface and a fluorescent-plate back surface configured to receive excitation light on the fluorescent-plate front surface and to emit fluorescence also from the fluorescent-plate front surface while generating heat;
a heat dissipation substrate having a heat-dissipation front surface and a heat-dissipation back surface configured to dissipate the heat generated in the fluorescent plate from the heat-dissipation back surface; and
a solder layer located between the fluorescent plate and the heat dissipation substrate and having a thickness and a dimension to match the fluorescent-plate back surface and the heat-dissipation front surface, the solder layer containing void whose void ratio is not more than 75% and maximum void diameter is not more than 0.4 mm, wherein the solder layer structurally binds the fluorescent-plate back surface to the heat-dissipation front surface together while transferring the heat generated in the fluorescent plate to the heat dissipation substrate.

2. The fluorescence light source apparatus according to claim 1, wherein the solder layer has a void ratio that is not more than 50% and a maximum void diameter is not more than 0.2 mm.

3. The fluorescence light source apparatus according to claim 1, further comprising a first metal film made of a nickel/platinum/gold (Ni/Pt/Au) film or a nickel/gold (Ni/Au) film that is located between the heat-dissipation front surface and the solder layer.

4. The fluorescence light source apparatus according to claim 3, further comprising a light reflection film that is located between the fluorescent-plate back surface and the solder layer.

5. The fluorescence light source apparatus according to claim 4, further comprising a second metal film is located between the light reflection film and the solder layer.

6. The fluorescence light source apparatus according to claim 1, wherein the heat dissipation substrate and the fluorescent plate each has a rectangular flat plate shape.

7. The fluorescence light source apparatus according to claim 1, wherein the solder layer has a thermal conductivity ranging from 40 W/(mK) to 70 W/(mK).

8. The fluorescence light source apparatus according to claim 1, wherein the solder layer has a thickness ranging from 20 μm to 200 μm.

9. The fluorescence light source apparatus according to claim 1, wherein the solder layer contains solder cream and structurally binds the fluorescent-plate back surface to the heat-dissipation front surface under reduced pressure in an inactive gas atmosphere including a nitrogen gas atmosphere, or in a mixed gas atmosphere of nitrogen gas and hydrogen gas.

10. The fluorescence light source apparatus according to claim 1, wherein the solder layer contains solder cream including flux and structurally binds the fluorescent-plate back surface to the heat-dissipation front surface under reduced pressure in an air atmosphere or a nitrogen gas atmosphere.

* * * * *